United States Patent [19]

Swerlick

[11] 3,959,526

[45] May 25, 1976

[54] PROCESS FOR PREPARING HIGH BARRIER, HEAT-SEALABLE PACKAGING FILM

[75] Inventor: Isadore Swerlick, Richmond, Va.

[73] Assignee: E. I. Du Pont de Nemours and Company, Wilmington, Del.

[22] Filed: Dec. 20, 1974

[21] Appl. No.: 535,141

[52] U.S. Cl............................ 427/209; 427/379; 427/381; 427/385; 427/390; 427/407; 428/520
[51] Int. Cl.² ................... B05D 1/38; B32B 27/30
[58] Field of Search .......... 427/407, 379, 385, 390, 427/381, 209; 428/520

[56] References Cited
UNITED STATES PATENTS

| | | | |
|---|---|---|---|
| 2,990,391 | 6/1961 | Grantham | 106/311 X |
| 3,166,435 | 1/1965 | Meier | 427/407 X |
| 3,353,990 | 11/1967 | Vieth et al. | 428/520 |
| 3,511,793 | 5/1970 | Ezell | 260/23 |
| 3,565,669 | 2/1971 | McDermott et al. | 427/177 |
| 3,676,185 | 7/1972 | Phillips et al. | 427/407 |

FOREIGN PATENTS OR APPLICATIONS

| | | |
|---|---|---|
| 1,234,143 | 6/1971 | United Kingdom |
| 1,333,566 | 10/1973 | United Kingdom |

OTHER PUBLICATIONS

Oswin, "Superior Cellophane Coatings Meet the Challenge of Plastics," TAPPI, vol. 57, No. 7, pp. 53–55, July, 1974.

*Primary Examiner*—Ralph Husack

[57] ABSTRACT

An improvement in a process for preparing a high barrier, heat-sealable packaging material. A flexible base sheet carrying at least a one side copolymer high barrier coating applied from a solvent solution receives a second copolymer coating having optimum heat sealing properties from a dilute solvent coating system thereby yielding, when finally dried, a double copolymer distribution on the base sheet surface having a low level of total retained solvents, particularly high boiling point solvents.

9 Claims, 1 Drawing Figure

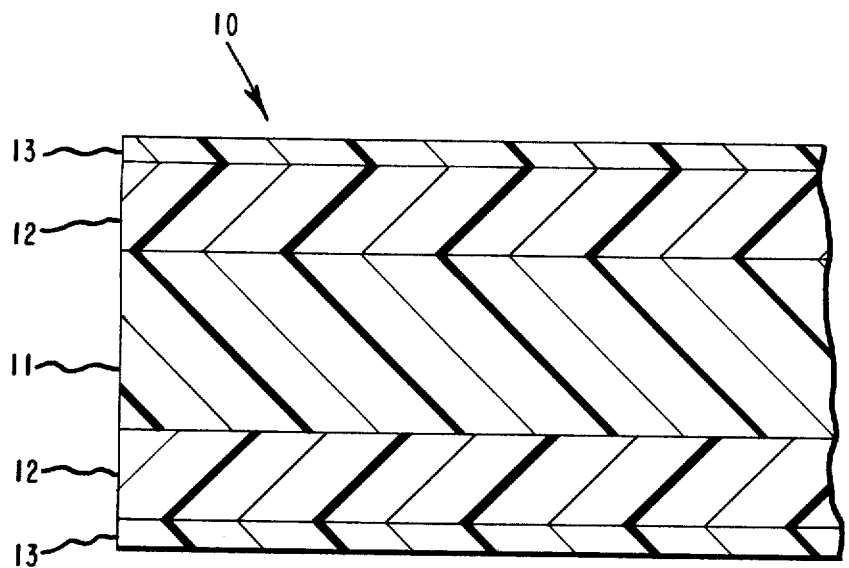

[3,959,526]

PROCESS FOR PREPARING HIGH BARRIER, HEAT-SEALABLE PACKAGING FILM

BACKGROUND OF THE INVENTION

This invention relates to an improvement in a process for preparing a packaging film and, more particularly, to an improvement in a process for preparing a heat-sealable, moisture-proof film having a double copolymer coating.

It is well known in the art to apply vinylidene chloride copolymer coatings to film substrates such as regenerated cellulose and plastic materials to obtain more functional products. For example, heat-sealability, barrier properties and optical properties can be substantially improved by adding coatings to the film substrate. Most of the available vinylidene chloride copolymers, however, offer a compromise between optimum barrier properties and low heat seal temperatures. Those polymers that are good barriers to moisture and oxygen are highly crystalline and require relatively high temperatures, i.e., above about 130°C., and long dwell times to heat seal, whereas those copolymers which will seal at the more desirable lower temperatures, i.e., about 80° to 90°C., are usually noncrystalline and, hence, poor barriers.

In addition good barrier properties and heat sealability, coated packaging films must have good machinability properties for easy handling. Thus, it is well known in the art to incorporate surface effect additives into the film coating systems to improve slip characteristics, anti-blocking properties and electrostatic conductivity. These additives, however, may cause the film's minimum heat seal temperature to increase.

To obtain an optimum combination of properties in packaging materials, therefore, it has been found that film substrates carrying more than one copolymer coating are desirable. British Pat. No. 1,234,143 to Phillips et al., for example, teaches the preparation of a heat-sealable, moisture-proof sheet material comprising a flexible base sheet having on each surface thereof a sub-coating and a top coating, both of which include a vinylidene chloride copolymer. Each coating layer is applied as an aqueous dispersion followed by a conventional drying step. Alternatively, the top coating may be applied from a volatile organic solvent solution containing about 30% solids.

The use of an aqueous dispersion containing a vinylidene chloride copolymer as a sub-coating and a top coating imply a copolymer layer adjacent the substrate which, of necessity, ordinarily contains a wetting agent. In high humidity atmospheres water vapor, usually absorbed at the interface between the film substrate and the coating layer, may substantially reduce the adhesion of the coating composition to the substrate. Top coating compositions which contain wetting agents, on the other hand, may interfere with heat sealing the film by raising minimum heat seal temperatures. It is also known that wetting agents, being generally poor barrier materials, may offer moisture pathways through the coating composition. Even when the top coating composition is applied from a suitable organic solvent solution, the presence of wetting agents in the sub-coating may degrade the barrier properties as well as the resultant high humidity adhesion properties of the film.

It has been recognized, in applications where a packaging film having extremely high barrier properties is preferred, that it is not generally practicable to apply the sub-coating to the base sheet from an organic solvent solution. Difficulties may occur because the preferred copolymers, i.e., those having a high vinylidene chloride content, may present solvent solubility problems. Moreover, even where the preferred copolymer is soluble in the solvent and is applied to the base sheet to form a suitable sub-coating, the subsequent top coating may interfere with the evaporation of solvent from both coating layers during the final heating and drying step. There can result, then, a film product having a double copolymer coating with an unacceptable amount of solvent retained within each coating layer, i.e., greater than 500 ppm for each constituent based on the total weight of coated film.

The method of the present invention can be used to overcome the problem of solvent retention and to offer a substantially improved high barrier packaging film.

SUMMARY OF THE INVENTION

Accordingly, there is provided in the present invention an improvement in a process for coating a flexible packaging film with a sub-coating of a high barrier vinylidene chloride copolymer and a top coating of a heat sealable vinylidene chloride copolymer, said coatings being dried, the improvement which consists in applying both coatings from a solvent solution of said copolymers, said top coating applied from a solution containing about 5 to 10% solids to a solids coating weight of about 0.5 to 3 grams/square meter.

The improvement of the present invention permits the use of ordinary solvent solution coating methods to obtain a film product having not only optimum barrier properties and optical properties, but also a useful level of heat sealability. Moreover, the level of solvents retained in the coatings after the final drying step can be reduced to less than about 500 ppm, thereby making the film produced according to the improvement of this invention suitable for use in the food packaging industry such as for freeze dried commodities.

BRIEF DESCRIPTION OF THE DRAWINGS

The FIGURE is a cross-sectional view, greatly enlarged, of a packaging film coated according to the improved process of the present invention.

DETAILED DESCRIPTION OF THE INVENTION

According to the present invention a base sheet of film carrying a one side and preferably two side copolymer barrier coating receives a second copolymer coating which is heat-sealable. Both copolymer layers, which essentially comprise vinylidene chloride copolymers, are applied sequentially from a volatile organic solvent solution using conventional coating techniques. Because of the improved process of the present invention, an unusually low level of solvent retained in each coating layer can be achieved. The resultant double coated film, furthermore, exhibits unusually good optical properties which compare favorably to films carrying only single coatings.

Referring now to the FIGURE there is shown a section of a double coated film 10 comprising a flexible base sheet 11 having a substantially uniform and continuous high barrier sub-coating 12 adhered to both surfaces thereof. Optionally, the copolymer high barrier coating 12 may be applied to only one surface of the base sheet. The copolymer sub-coating carries a top coating 13 of a heat-sealable copolymer.

The film selected as a base material can be any cellulosic material such as regenerated cellulose or a plastic material such as a polyester. In a preferred embodiment the base sheet is polyethylene terephthalate.

The copolymer sub-coating 12 is selected for maximum water vapor and gas impermeability. Such copolymers are well known to those skilled in the art. This is ordinarily achieved with those copolymers containing relatively high concentrations of vinylidene chloride, i.e., in excess of about 85% by weight of vinylidene chloride, usually in excess of about 89% by weight. Ordinarily, at least one other ethylenically unsaturated monomer copolymerizable therewith such as methacrylonitrile is included in the coating composition. Specific copolymers preferred in practicing the process of this invention include vinylidene chloride/methacrylonitrile/methyl methacrylate/itaconic acid copolymer of approximate weight ratio 90/5/5/0.3 and vinylidene chloride/methacrylonitrile/methyl methacrylate/itaconic acid copolymer of approximate weight ratio 89/7/4/0.3.

The copolymer top coating 13 may also contain relatively high concentration of vinylidene chloride, i.e., ordinarily about 87 to 92% by weight of vinylidene chloride. The copolymer is selected, however, from the group of copolymers having the most desirable heat sealing properties. In a preferred embodiment the copolymer used for the top coating is vinylidene chloride/acrylonitrile/methyl methacrylate/itaconic acid of approximate weight ratio 91/4/5/0.3.

The coating solutions are prepared according to conventional procedures for making coating compositions of high polymer content. Organic solvent mixtures of tetrahydrofuran in the range of about 60 to 80% and toluene in the range of about 40 to 20% and having about 15 to 20% solids are the preferred solutions for applying the sub-coating. In a preferred embodiment the sub-coating total weight is in the range of about 5 to 10 grams/square meter of film for a base sheet carrying a two side coating.

The key process improvement upon which this invention is based is the discovery that a top coating can be applied to a solvent-applied sub-coating from a dilute organic solvent solution having about 5 to 10% solids and, when finally dried, achieve a level of retained solvents in both coating layers of less than about 500 ppm for each constituent. The total weight of the top coating is preferably about 1 to 2 grams/square meter for a two side coating.

By following the improved process of the present invention it is possible to prepare a double copolymer coated 0.5 mil packaging film of polyethylene terephthalate having an initial permeability value of about 15 and capable of forming outstanding heat seals at high humidity. Initial permeability value or IPV is a measure of the moisture proofness of a coated film. The definition of IPV and preferred test for moisture proofness are set forth in U.S. Pat. No. 2,147,180 to Ubben issued Feb. 14, 1939. Generally, a coated film having an IPV of 100 grams of water/100 square meters/hour, or less, at 39.5°C. is considered to have satisfactory moisture proofness.

As well as achieving low IPV values, films prepared in accordance with the process of this invention exhibit excellent optical properties. For example, measured values for % haze for double coated film are generally less than haze values obtained for films carrying only one copolymer coating. The haze of a film specimen is that percentage of transmitted light which in passing through the specimen deviates from the incident beam by forward scattering. The standard method of determining haze values is set out in ASTM D 1003-61.

The coating compositions for both the sub-coating and the top coating ordinarily contain, as required, surface effect additives to improve the surface characteristics of the film for ease in handling. For example, a commercially prepared stearamide such as "Armid 18" manufactured by Armour Industrial Chemical Co. or "Kenamide S" manufactured by Humko Chemical Co., Division of Kraftco enchance anti-blocking properties as well as other agents such as calcium silicate, mica and steatite talc having average particle diameters as much as the thickness of the coating or greater. Also, slip agents such as an ester or hydrocarbon wax such as carnauba wax or candelilla wax are desirable along with surface adhesion promoters to insure the adhesion of the sub-coating to the base sheet.

The coating composition used in practicing this invention can be applied to the film in any known type of coating apparatus capable of handling volatile organic solvent mixtures. Metering the coating solution can be accomplished by means known in the art with such apparatus as doctor rolls, doctor knives, gravure rolls or the like.

The following examples, wherein are set forth specific embodiments, will further illustrate the qualities obtained by preparing packaging films according to the improved process of this invention. Parts and percentages are by weight unless otherwise indicated.

EXAMPLE 1

A base film of 50 gauge polyethylene terephthalate (PET) receives a two side solvent sub-coating of a copolymer including vinylidene chloride/methacrylonitrile/methyl methacrylate/itaconic acid of weight ratio 90/5/5/0.3. The solvent mixture is a tetrahydrofuran/toluene system containing about 16 weight percent of the copolymer.

Ordinarily, the coating compositions for PET film also contain about 0.1 to 6 weight percent, based on the vinylidene chloride polymer, of a linear polyester resin prepared by condensing a glycol, e.g., ethylene glycol, and a polyfunctional acid, at least 70 weight percent of which is an aromatic polyfunctional acid, e.g., terephthalic acid, for the purpose of improving film surface/coating adhesion. Commercially available polyester resins of polyethylene terephthalate such as "Vitel" PE 100 sold by Goodyear Chemical Company are satisfactory.

The complete formulation for the barrier sub-coating is as follows:

| Copolymer Resin | 16% |
|---|---|
| Additives: | |
| "Vitel" PE-100 | 0.75% |
| Carnauba Wax | 0.5% |
| Armid 18 | 0.5% |
| Steatite talc | 0.5% |

The coating solution was prepared in a tetrahydrofuran (THF)/toluene mixture in a 70:30 ratio with 16% solids, and a uniform and continuous distribution of the copolymer was applied and dried on both surfaces of the film to a total coating weight of about 5–6 grams/square meter.

The top coating is a heat-sealable vinylidene chloride copolymer including vinylidene chloride/acrylonitrile/methyl methacrylate/itaconic acid of weight ratio of about 91/4/5/0.3. The solvent mixture is a THF/toluene solution in a 75/25 ratio with a solids content in the range of about 5–10%. The complete formulation for the top, heat-sealable coating is as follows:

| Copolymer Resin | 10.3% |
|---|---|
| Additives: | |
| Candelilla Wax | 1.0% |
| Behenic Acid | 2.0% |
| Talc | 0.6% |

Table I illustrates the properties obtained with the PET having only the sub-coating and the properties achieved with the top coating.

TABLE I

Double Coated Polyethylene Terephthalate
Properties of Subcoated Film

| Coating Weight | 5 grams/square meter |
|---|---|
| Residual Solvents | |
| THF | 0 ppm |
| Toluene | 362 ppm |
| Haze | 5.3% |
| IPV | 16 |

Properties of Topcoated Film (total structure except as indicated)

| Coating Weight (top coating alone) | 1 gram/square meter |
|---|---|
| Residual Solvents | |
| THF | 35 ppm |
| Toluene | 300 ppm |
| Haze | 5% |
| IPV | 14 |

EXAMPLE 2

A base sheet of regenerated cellulose 0.7 mil in thickness receives a two side solvent sub-coating of a copolymer including vinylidene chloride/methacrylonitrile/methyl methacrylate/itaconic acid of weight ratio of about 90/5/5/0.3. The solvent mixture is a THF/toluene system in a 70/30 ratio containing about 16% solids. The sub-coat composition is as follows:

| Copolymer Resin | 16% |
|---|---|
| Additives: | |
| Carnauba Wax | .5% |
| Armid 18 | .5% |
| Talc | .5% |

The coating composition was applied and dried on both surfaces of the regenerated cellulose base sheet to a uniform and continuous distribution of about 5 grams/square meter.

The top coating is a vinylidene chloride copolymer including vinylidene chloride/acrylonitrile/methyl methacrylate/itaconic acid of weight ratio of about 91/4/5/0.3. The solvent mixture is a THF/toluene solution in a 75/25 ratio with a solids content in the range of about 5–10%. The complete formulation for the top coating is as follows:

| Copolymer Resin | 9.7% |
|---|---|
| Additives: | |
| Candellila Wax | 1.0% |
| Behenic Acid | 2.0% |
| Talc | 0.6% |

Table II illustrates the properties of the film carrying only the sub-coating with the properties obtained with the top coating:

TABLE II

Double Coated Regenerated Cellulose
Properties of Subcoated Film

| Coating Weight | 5 grams/square meter |
|---|---|
| IPV | 19 |
| Residual Solvents | |
| THF | 95 ppm |
| Toluene | 180 ppm |
| Haze | 3.1% |

Properties of Topcoated Film (total structure except as indicated)

| Coating Weight (top coating alone) | 1.7 grams/square meter |
|---|---|
| IPV | 11 |
| Residual Solvents | |
| THF | 130 ppm |
| Toluene | 415 ppm |
| Haze | 2.5 |

The improved process of the present invention provides a method of using conventional solvent solution coating techniques to obtain a high barrier, heat-sealable packaging film that exhibits a low level of retained solvents and offers extended shelf life where moisture proofness is of utmost importance.

What is claimed is:

1. In a process for coating a flexible packaging film with a sub-coating of a high barrier vinylidene chloride copolymer and a top coating of a heat sealable vinylidene chloride copolymer, said coatings being dried after applications,
   the improvement which consists in applying both coatings from a solvent solution of said copolymers, said top coating applied from a solution containing about 5 to 10% solids to a solids coating weight of about 0.5 to 3 grams/square meter, and drying said coated film to a level of retained solvents in both coating layers of less than about 500 ppm for each constituent of said solvent solution.

2. The improved process as defined in claim 1 wherein said sub-coating and said top coating are applied to both sides of said flexible packaging film.

3. The process as defined in claim 2 wherein said top coating is applied to a solids coating weight of about 1 to 2 grams/square meter.

4. The process as defined in claim 3 wherein said copolymer high barrier coating is vinylidene chloride copolymer containing about 89 to 95% by weight of vinylidene chloride.

5. The process as defined in claim 4 wherein said vinylidene chloride copolymer high barrier coating further contains units of methacrylonitrile/methyl methacrylate/itaconic acid.

6. The process as defined in claim 3 wherein said top, heat sealable coating of vinylidene chloride copolymer further contains units of acrylonitrile/methyl methacrylate/itaconic acid.

7. The process as defined in claim 6 wherein said packaging film is regenerated cellulose.

8. The process as defined in claim 7 wherein said packaging film is polyethylene terephthalate.

9. The process as defined in claim 6 wherein said organic solvent solution for said top coating is a tetrahydrofuran/toluene solution containing from about 60 to 80 weight percent tetrahydrofuran.

* * * * *